United States Patent [19]
Carr

[11] Patent Number: 5,963,707
[45] Date of Patent: Oct. 5, 1999

[54] METHOD AND APPARATUS FOR DETERMINING AND ADJUSTING TORQUE IN AN ELECTRIC IMPACT TORQUE WRENCH

[75] Inventor: Ronald L. Carr, Kelso, Wash.

[73] Assignee: KC Multi-Ring Products, Inc., Kelso, Wash.

[21] Appl. No.: 08/844,385

[22] Filed: Apr. 18, 1997

Related U.S. Application Data

[60] Provisional application No. 60/016,068, Apr. 23, 1996.

[51] Int. Cl.⁶ .................................................... H02P 5/17
[52] U.S. Cl. ........................................ 388/811; 73/862.21
[58] Field of Search .................................. 388/930, 819, 388/811; 702/41, 42, 43, 44; 73/862.21

[56] References Cited

U.S. PATENT DOCUMENTS

| | | | |
|---|---|---|---|
| 4,168,454 | 9/1979 | Gmeinder | 318/432 |
| 4,177,412 | 12/1979 | Minakuchi | 318/341 |
| 5,440,215 | 8/1995 | Gilmore | 318/432 |
| 5,526,460 | 6/1996 | DeFrancesco et al. | 388/831 |
| 5,731,673 | 3/1998 | Gilmore | 318/432 |

*Primary Examiner*—George Dombroske
*Assistant Examiner*—Jewel V. Thompson
*Attorney, Agent, or Firm*—Birdwell & Janke, LLP

[57] ABSTRACT

A method and apparatus for adjusting torque in an electric impact torque wrench. A current sensing circuit passes current through a power relay for powering an electric impact torque wrench. The power relay is normally in a conducting state. The current sensing circuit includes a threshold current indicator which is activated when current flowing through the current sensing circuit reaches a predetermined threshold amount. The threshold current indicator is provided to a first timer which counts an activation-off time since the threshold indicator is activated, the first timer presuming that the current has remained above the predetermined threshold amount during this time. At the conclusion of the activation-off time, the first timer signals a time-off extender circuit. On receipt of the signal, the time-off extender circuit (1) switches the power relay to a non-conducting state, to interrupt the flow of current therethrough, (2) counts a predetermined time-off time, at the conclusion of which the time-off extender circuit switches the power relay back to the conducting state, and (3) resets the first timer for repeat of the aforedescribed cycle.

11 Claims, 1 Drawing Sheet

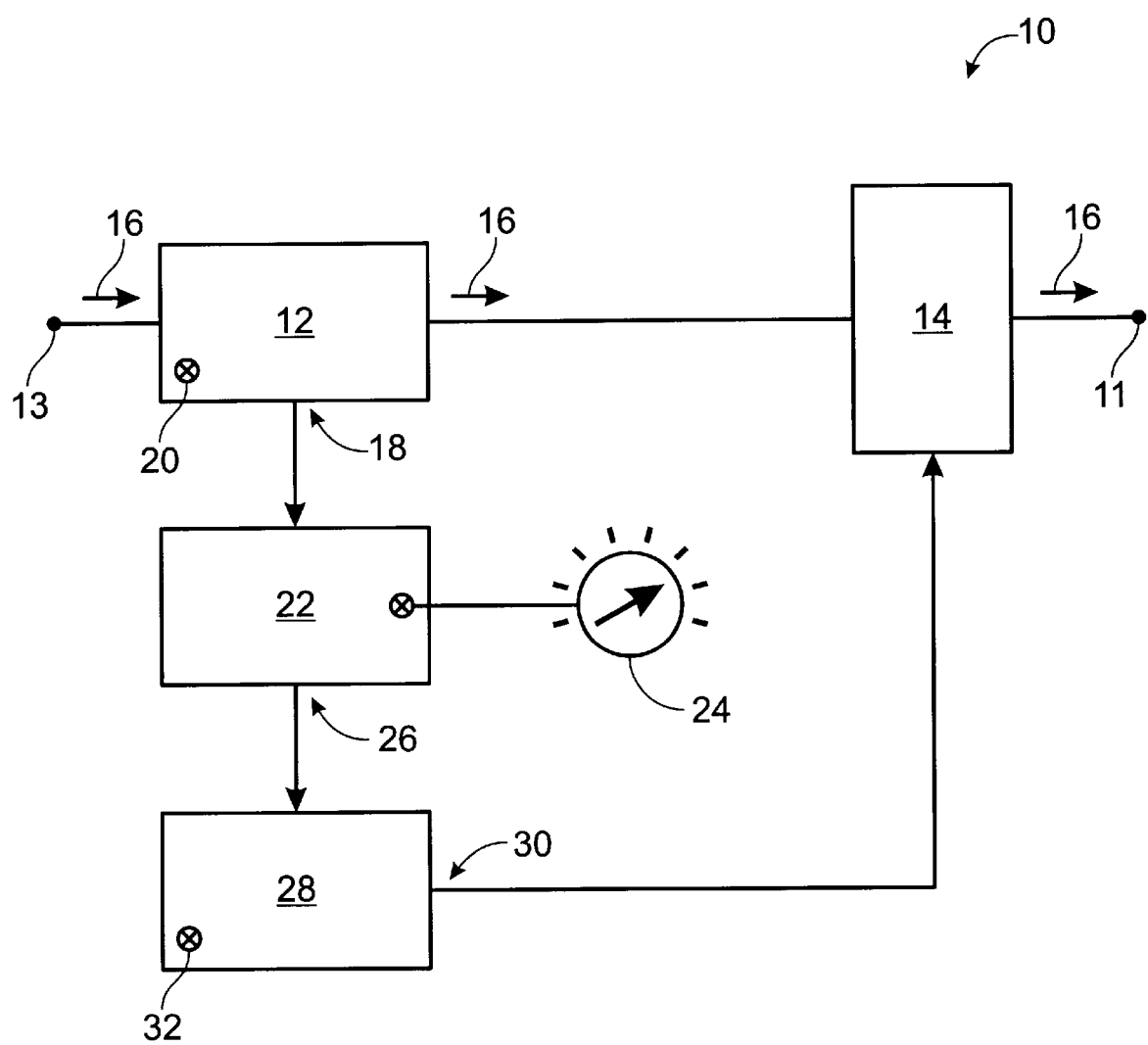

METHOD AND APPARATUS FOR DETERMINING AND ADJUSTING TORQUE IN AN ELECTRIC IMPACT TORQUE WRENCH

This application claims the benefit of U.S. Provisional Application No. 60/016,068, filed Apr. 23, 1996.

BACKGROUND OF THE INVENTION

This invention relates to determining and adjusting the torque of an electric torque wrench, particularly an electric torque wrench employed for tightening pipe flanges.

While pneumatic impact torque wrenches have long been available, such wrenches require a source of pressurized air. Electric impact torque wrenches, therefore, are generally employed for field or other portable uses. For example and for particular purposes of the present invention, electric impact torque wrenches are advantageously employed by pipe-fitters for tightening the bolts of pipe flanges at a job site, during construction or repair of plumbing systems.

Pipe flanges, particularly pipe flanges for pipes carrying fluids under pressure, often employ gaskets therebetween to prevent leakage of the fluids out of the flanged joint. The gasket is resilient and functions by compressing, thereby conforming to surface irregularities of the flange surfaces when bolts between the pipe flanges are tightened. The gasket compresses particularly in regions proximate the bolts which are being tightened.

Because the gasket compresses and allows movement of the flanges toward one another while the bolts are being tightened, it is often important to tighten the bolts so as to distribute the tightening stresses around the pipe flanges as evenly as possible. This helps to draw the flanges together evenly, which reduces differential stresses on the flanges as well as causes the gasket to compress more evenly and, therefore, to more effectively prevent leakage.

Bolt tightening methods known in the art to be effective at distributing applied tightening stresses evenly over the flanges and gasket of a pipe joint typically employ a pattern of tightening the bolts wherein the pattern is repeated for a plurality of increased torque values of a tightening device such as a torque wrench. For example, where a pipe joint flange employs four bolts which, for reference, are labeled #1, #2, #3 and #4 as they appear in a clockwise pattern, a preferred tightening pattern might be to tighten bolt #1, followed by tightening bolt #3, followed by tightening bolt #2, followed by tightening bolt #4. All of the bolts would be tightened in a first round of tightening. Then the same tightening pattern would be employed for a second round of tightening. Typically, three rounds of the tightening pattern are employed to complete tightening of the pipe joint flanges.

Carrying out a preferred bolt tightening method for pipe joints, such as that aforedescribed, requires a device for applying a well controlled torque. Hand operated torque wrenches may provide for a relatively precise application of torque but have well known disadvantages. For example, the passive torque wrench is relatively slow and requires a greater span over which a handle end thereof is permitted to swing.

Electric torque wrenches may provide for greater speed and reduced operator work and space requirements, however, controlling the torque in such devices has required relatively expensive electrical or mechanical components. Typically, such devices measure the torque directly, by employing electro-mechanical sensors for force and, sometimes, angle of rotation. Such devices must also include relatively expensive measuring circuitry to interpret the output of the sensors. As a result of the cost of such devices, particularly for connecting pipe joints for plumbing construction or repair, use thereof is often foregone and hand operated tools are employed instead.

Where electric torque wrenches have been employed, it has nonetheless been difficult for operators to determine what the torque settings of the wrench should be. For one thing, the torque required for tightening a pipe joint depends on the physical size of the gasket or surface area thereof However, plumbers are used to thinking in terms of the diameter of the pipe. But the gasket surface area is not in general determined for a given pipe diameter. Rather, a single pipe diameter may employ flanges having a diameter that lies anywhere within a range.

Accordingly, there is a need for a method and apparatus for determining and adjusting the torque in an electric impact torque wrench which provides for relatively low cost control of torque, particularly for use in a standard tightening method for the tightening of pipe joints, and which provides for facilitating the determination of desirable torque settings by plumbers in the field.

SUMMARY OF THE INVENTION

The method and apparatus for determining and adjusting the torque in an electric impact torque wrench of the present invention solves the aformentioned problems and meets the aforementioned needs by employing a current sensing circuit for sensing current passed through a power relay for powering an electric impact torque wrench. The power relay is normally in a conducting state. The current sensing circuit includes a threshold current indicator which is activated when current flowing through the current sensing circuit reaches a predetermined threshold amount. The threshold current indicator is provided to a first timer which counts an activation-off time since the threshold indicator is activated, the first timer presuming that the current has remained above the predetermined threshold amount during this time. At the conclusion of the activation-off time, the first timer signals a time-off extender circuit. On receipt of the signal, the time-off extender circuit (1) switches the power relay to a non-conducting state, to interrupt the flow of current therethrough, (2) counts a predetermined time-off time, at the conclusion of which the time-off extender circuit (3) switches the power relay back to the conducting state, and (3) resets the first timer for repeat of the aforedescribed cycle.

Therefore, it is a principal object of the present invention to provide a novel and improved method and apparatus for determining and adjusting the torque in an electric impact torque wrench, particularly for use in the tightening of pipe joints.

It is another object of the present invention to provide such a method and apparatus which provides for controlling the torque at relatively low cost, particularly for encouraging greater use of typical, preferred methods of tightening pipe flanges.

It is yet another object of the present invention such a method and apparatus which provides for increased simplicity in the determination of appropriate torque settings of the electric impact torque wrench.

The foregoing and other objects, features and advantages of the present invention will be more readily understood upon consideration of the following detailed description of the invention, taken in conjunction with the following drawings.

BRIEF DESCRIPTION OF THE DRAWINGS

The FIGURE is a block diagram of an apparatus for adjusting the torque of an electric impact torque wrench according to the present invention.

An electric impact wrench torque adjustor according to the present invention is adapted for use with an electric impact wrench which supplies a series of impulses, preferably at a substantially constant rate. Each impulse preferably provides a substantially predetermined energy and is applied to twist a head adapted for receiving a socket or other twisting tool. The torque adjustor provides for the adjustment of applied torque by adjusting the duty cycle in which the impact wrench is provided power for operation.

Referring to FIG. 1, a preferred embodiment of the electric impact wrench torque adjustor 10 provides power to an electric impact wrench (not shown) at a power output 11 and includes a current sensing circuit 12 and a normally-on power relay 14 through which power current 16 normally flows from a power source 13. The current sensing circuit 12 includes a threshold current indicator signal 18, which is activated when the current 16 flowing through the current sensing circuit 12 is determined to reach a preselected threshold value set by a current threshold selection adjustor 20. The threshold value of current is selected so that threshold current is indicated when the impact wrench has begun to encounter resistance to its applied torque.

The threshold current indicator signal 18 is input to a torque application timer 22, which commences to measure the time since the indicator signal has been activated until a predetermined activation-off time is reached which is settable at an adjustor 24. Preferably, the adjustor 24 is a multiple contact potentiometer for providing a plurality of time adjustments. At the conclusion of the activation-off time, the torque application timer 22 outputs an activation-off signal 26 to a time-off extender circuit 28.

The time-off extender circuit 28, upon receipt of the activation-off signal 26, outputs a time-off signal 30 to the normally on power relay 14, to interrupt the current 16. The time-off signal remains activated for a preselected delay time adjusted at the adjustor 32, during which the application timer 22 deactivates the activation-off signal 26, to reset the application timer 22. Interruption of the current 16 deactivates the threshold current indicator signal 18 at the current sensing circuit 12.

At the conclusion of the preselected delay time, the time-off signal 30 is deactivated, thereby restoring the current 16 by returning the power relay 14 to its normally on condition, to repeat the aforementioned duty cycle.

The torque adjustor is employed with the electric impact wrench by setting the current threshold selection adjustor 20, the adjustor 24, and the adjustor 32 so that, preferably, three duty cycles are employed to complete provision of the desired torque at the socket or other twisting tool, so that each duty cycle provides substantially about 33% of the total torque and is, therefore, substantially about 33% of the total time required for the achievement of the total torque. Preferably, a plurality of subjects to be tightened, such as bolts, are all tightened with a first, respective, duty cycle of the torque adjustor before a second, and subsequently a third, respective cycle is employed therefor, in order to minimize any stress differential applied between the plurality of subjects, as will be readily appreciated by those of ordinary skill in the art.

It is also advantageous to employ with the electric impact wrench torque adjustor of the present invention a gasket substantially as described in Carr, U.S. Pat. No. 5,362,115, herein incorporated by reference in its entirety, and as described in the inventor's PCT application Ser. No. PCT/US93/05343, the subject matter of which is also incorporated by reference herein in its entirety. The gasket described is advantageously adapted to a given pipe diameter or size by adjusting the surface area of the inner ring, the outer ring and the spokes so that, for any flange diameter or size employed with the given pipe diameter the surface area is caused to the be same. Thence, the aforementioned settings of the torque adjustor 10 may be conveniently determined with reference to the pipe diameter or size, regardless of flange diameter or size.

I claim:

1. An apparatus for adjusting torque in an electric impact wrench to provide a desired torque, comprising:

a power input for receiving electrical power from an electrical current source;

a switchable electrical power output for selectably delivering said electrical power to the electric impact torque wrench, said switchable electrical power output being adapted for switching between a substantially conducting state of said electrical power output and a substantially non-conducting state thereof;

a power sensing circuit coupled to said electrical power input and adapted for determining whether said power exceeds a predetermined threshold amount; and a first timing circuit coupled to said power sensing circuit and adapted for timing a predetermined on-duty time interval after said power is determined to exceed said threshold amount, wherein said switchable electrical power output is adapted to switch from said conducting state to said non-conducting state at substantially the end of said on-duty time interval for a substantial fraction of the total time required to provide the desired torque.

2. The apparatus of claim 1, wherein said power is an electrical current.

3. The apparatus of claim 1, wherein said electrical power output includes a power relay.

4. The apparatus of claim 1, wherein said on-duty time interval is determined immediately after said power is determined to exceed said threshold amount.

5. The apparatus of claim 1, further comprising a second timing circuit coupled to said first timing circuit and adapted for timing a predetermined off-duty time interval since about the end of said on-duty time interval, wherein said switchable electrical power output is adapted to switch from said non-conducting state to said conducting state at substantially the end of said off-duty time interval.

6. A method for adjusting torque in an electric impact torque wrench to provide a desired torque, comprising:

providing a switchable source of electrical power to the electric impact torque wrench, said switchable source of electrical power being adapted for switching said electrical power between a substantially on state and a substantially off state; determining whether the power exceeds a predetermined threshold amount;

timing, after the time said power is determined to exceed said predetermined threshold amount, a predetermined on-duty time interval; and switching, after about the end of said on-duty time interval, said switchable source of electrical power from said substantially on state to said substantially off state for a substantial fraction of the total time required to provide the desired torque.

7. The method of claim 6, wherein said electric impact torque wrench is adapted for joining two or more pipe sections having substantially the same outer diameters at respective flanged ends thereof, the flanges being coupled to one another through a gasket, the flanges having a plurality of apertures therethrough for receiving an associated plurality of bolts for drawing the flanges together and thereby compressing the gasket when tightened with the electric impact torque wrench, the gasket having a first strip of sealing material formed in a substantially continuous loop having a predetermined shape, said strip having an outer periphery whose size is greater than the inner periphery of the flanges, a second strip of sealing material formed in a substantially continuous loop having a predetermined shape, said strip having an inner periphery whose size is greater than said outer periphery of said first strip and less than the outer periphery of said flanges, and a plurality of spokes of sealing material, each disposed between and attached to said first strip and said second strip, and extending between said first strip and said second strip, the method further comprising providing the gasket to have a predetermined surface area which is associated with the outer diameter of the pipes by varying the surface area of said first strip, said second strip and said spokes, for determining said predetermined on-duty time based on the outer diameter of the pipes.

8. The method of claim 6, wherein said timing said predetermined on-duty time interval is immediately after the time said power is determined to exceed said predetermined threshold amount.

9. The method of claim 8, further comprising timing, from about the end of said on-duty time interval, a predetermined off-duty time interval, and switching, after about the end of said off-duty time interval, said switchable source of electrical power from said substantially off state to said substantially on state.

10. The method of claim 9, further comprising, after about the end of said off-duty time interval, repeating said step of timing said on-duty time interval.

11. The method of claim 10, wherein said on-duty time corresponds to providing about 33 % of the total torque desired in the electric impact torque wrench.

* * * * *